ated States Patent (12) United States Patent
Ko et al.

(10) Patent No.: US 8,107,455 B2
(45) Date of Patent: Jan. 31, 2012

(54) METHOD FOR TRANSMITTING DATA IN MULTIPLE ANTENNA SYSTEM

(75) Inventors: Hyun Soo Ko, Anyang-si (KR); Moon II Lee, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/056,620

(22) PCT Filed: Jul. 27, 2009

(86) PCT No.: PCT/KR2009/004171
§ 371 (c)(1),
(2), (4) Date: Jan. 28, 2011

(87) PCT Pub. No.: WO2010/013919
PCT Pub. Date: Feb. 4, 2010

(65) Prior Publication Data
US 2011/0158219 A1    Jun. 30, 2011

Related U.S. Application Data

(60) Provisional application No. 61/084,622, filed on Jul. 30, 2008, provisional application No. 61/154,424, filed on Feb. 22, 2009, provisional application No. 61/184,844, filed on Jun. 8, 2009, provisional application No. 61/220,595, filed on Jun. 26, 2009, provisional application No. 61/222,121, filed on Jul. 1, 2009, provisional application No. 61/222,897, filed on Jul. 2, 2009.

(30) Foreign Application Priority Data
Jul. 23, 2009    (KR) .................. 10-2009-0067495

(51) Int. Cl.
*H04B 7/208* (2006.01)
(52) U.S. Cl. ................... 370/344; 370/208; 370/480
(58) Field of Classification Search .............. 370/208, 370/344, 480
See application file for complete search history.

(56) References Cited

U.S. PATENT DOCUMENTS

| | | | |
|---|---|---|---|
| 7,881,395 B2 * | 2/2011 | Lee et al. ............... | 375/267 |
| 7,961,808 B2 * | 6/2011 | Ihm et al. .............. | 375/267 |
| 2005/0129138 A1 | 6/2005 | Vaananen et al. | |
| 2006/0039489 A1 | 2/2006 | Ikram et al. | |
| 2007/0037519 A1 | 2/2007 | Kim et al. | |
| 2007/0189151 A1 | 8/2007 | Pan et al. | |
| 2007/0223681 A1 | 9/2007 | Walden et al. | |
| 2007/0248113 A1 | 10/2007 | Ko et al. | |

(Continued)

FOREIGN PATENT DOCUMENTS
KR    1020070089562    8/2007
(Continued)

*Primary Examiner* — Jason Mattis
(74) *Attorney, Agent, or Firm* — Lee, Hong, Degerman, Kang & Waimey (57) ABSTRACT

A method of sending data in a multiple antenna system according to an aspect of the present invention includes performing precoding on received symbols based on a second codebook generated from a first codebook for a plurality of transmission antennas and sending the precoded symbols. The second codebook is a codebook for transmission antennas which are a multiple of an integer of the plurality of transmission antennas, and a precoding matrix included in the second codebook is generated by a combination of precoding matrices included in the first codebook.

20 Claims, 6 Drawing Sheets

U.S. PATENT DOCUMENTS

| | | | |
|---|---|---|---|
| 2008/0049709 A1* | 2/2008 | Pan et al. | 370/344 |
| 2008/0080459 A1 | 4/2008 | Kotecha et al. | |
| 2008/0080634 A1 | 4/2008 | Kotecha et al. | |
| 2008/0094281 A1 | 4/2008 | Teng et al. | |
| 2008/0095258 A1 | 4/2008 | She et al. | |
| 2008/0198946 A1* | 8/2008 | Lee et al. | 375/299 |
| 2008/0260058 A1* | 10/2008 | Li | 375/260 |
| 2009/0006518 A1* | 1/2009 | Rensburg et al. | 708/520 |
| 2009/0274230 A1 | 11/2009 | Heath et al. | |
| 2010/0284484 A1* | 11/2010 | Jongren et al. | 375/267 |
| 2011/0058621 A1 | 3/2011 | Clerckx et al. | |

FOREIGN PATENT DOCUMENTS

| | | |
|---|---|---|
| KR | 1020070113941 | 11/2007 |
| KR | 1020080026010 | 3/2008 |
| KR | 1020080036499 | 4/2008 |
| KR | 1020080039711 | 5/2008 |
| WO | 03-021795 A2 | 3/2003 |
| WO | 2005-076758 A2 | 8/2005 |
| WO | 2008-044830 A1 | 4/2008 |

* cited by examiner

METHOD FOR TRANSMITTING DATA IN MULTIPLE ANTENNA SYSTEM

CROSS-REFERENCE TO RELATED APPLICATIONS

This application is a 371 U.S. national stage application of International Application No. PCT/KR2009/004171, filed on Jul. 27, 2009, which claims priority to Korean Application No. 10-2009-0067495, filed on Jul. 23, 2009, and U.S. Provisional Application Serial Nos. 61/222,897, filed on Jul. 2, 2009, 61/222,121, filed on Jul. 1, 2009, 61/220,595, filed on Jun. 26, 2009, 61/184,844, filed on Jun. 8, 2009, 61/154,424, filed on Feb. 22, 2009, and 61/084,622, filed on Jul. 30, 2008, the contents of which are incorporated by reference herein in their entirety.

BACKGROUND OF THE INVENTION

1. Field of the Invention

The present invention relates to wireless communication, and more specifically to a method of sending data using multiple antennas.

2. Discussion of the Related Art

A Multiple-Input Multiple-Output (MIMO) has recently been in the spotlight in order to maximize the performance and communication capacity of a wireless communication system. MIMO technology is a method which breaks away from technology using one transmission antenna and one reception antenna and can improve the transmission efficiency of transmission/reception data by adopting multiple transmission antennas and multiple reception antennas. An MIMO system is also called a multiple antenna system. MIMO technology is the application of technology for gathering and completing data pieces received by several antennas without being dependent on a single antenna path in order to receive one entire message. Consequently, the data transfer rate may be improved in a specific range or the range of a system for a specific data transfer rate may be increased.

MIMO technology includes a transmission diversity, spatial multiplexing, beamforming, and so on. The transmission diversity is technology for sending the same data through multiple transmission antennas in order to increase transmission reliability. The spatial multiplexing is technology for sending data at high speed without increasing the bandwidth of a system by sending different data through multiple transmission antennas at the same time. The beamforming is used to increase the Signal to Interference plus Noise Ratio (SINR) of a signal by applying a weight according to a channel state in multiple antennas. The weight may be represented by a weight vector or a weight matrix and called a precoding vector or a precoding matrix.

The spatial multiplexing includes spatial multiplexing for a single user and spatial multiplexing for multiple users. The spatial multiplexing for a single user is called a Single User MIMO (SU-MIMO), and the spatial multiplexing for multiple users is called Spatial Division Multiple Access (SDMA) or a Multi-User MIMO (MU-MIMO). The capacity of an MIMO channel is increased in proportion to the number of antennas. An MIMO channel may be divided into independent channels. Assuming that the number of transmission antennas is Nt and the number of reception antennas is Nr, the number of independent channels Ni is $Ni \leq \min\{Nt, Nr\}$. Each of the independent channels may be said to be a spatial layer. A rank is the number of non-zero eigenvalues of an MIMO channel matrix and may be defined as the number of spatial streams that can be multiplexed.

MIMO technology includes a codebook-based precoding scheme. The codebook-based precoding scheme is a method of selecting a precoding matrix which is the most similar to an MIMO channel, from among predetermined precoding matrices, and sending a Precoding Matrix Index (PMI). This method can reduce the overhead of feedback data. A codebook consists of codebook sets which can represent spatial channels. In order to increase the data transfer rate, the number of antennas has to be increased. With an increase of the number of antennas, a codebook has to consist of a more number of codebook sets. If the number of codebook sets increases according to the increased number of antennas, not only the overhead of feedback data may be increased, but also there is a difficulty in designing the codebook.

There is a need for a method to which a codebook-based precoding scheme can be efficiently applied in a multiple antenna system having an increased number of antennas as compared with the existing number of antennas.

SUMMARY OF THE INVENTION

It is, therefore, an object of the present invention to provide a method capable of efficiently applying a codebook-based precoding scheme to multiple increased antennas by utilizing the existing codebook.

A method of sending data in a multiple antenna system according to an aspect of the present invention includes performing precoding on received symbols based on a second codebook generated from a first codebook for a plurality of transmission antennas and sending the precoded symbols. The second codebook is a codebook for transmission antennas which are a multiple of an integer of the plurality of transmission antennas, and a precoding matrix included in the second codebook is generated by a combination of precoding matrices included in the first codebook.

A transmitter according to another aspect of the present invention includes a precoder for performing precoding based on a second codebook for an sxt number of transmission antennas which is generated from a first codebook for a t number of transmission antennas (t and s are an integer greater than 1), a subcarrier mapper for mapping symbols, precoded by the precoder, to subcarriers, and an OFDM signal generator for outputting the symbols, mapped to the subcarriers, in the form of an OFDM signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
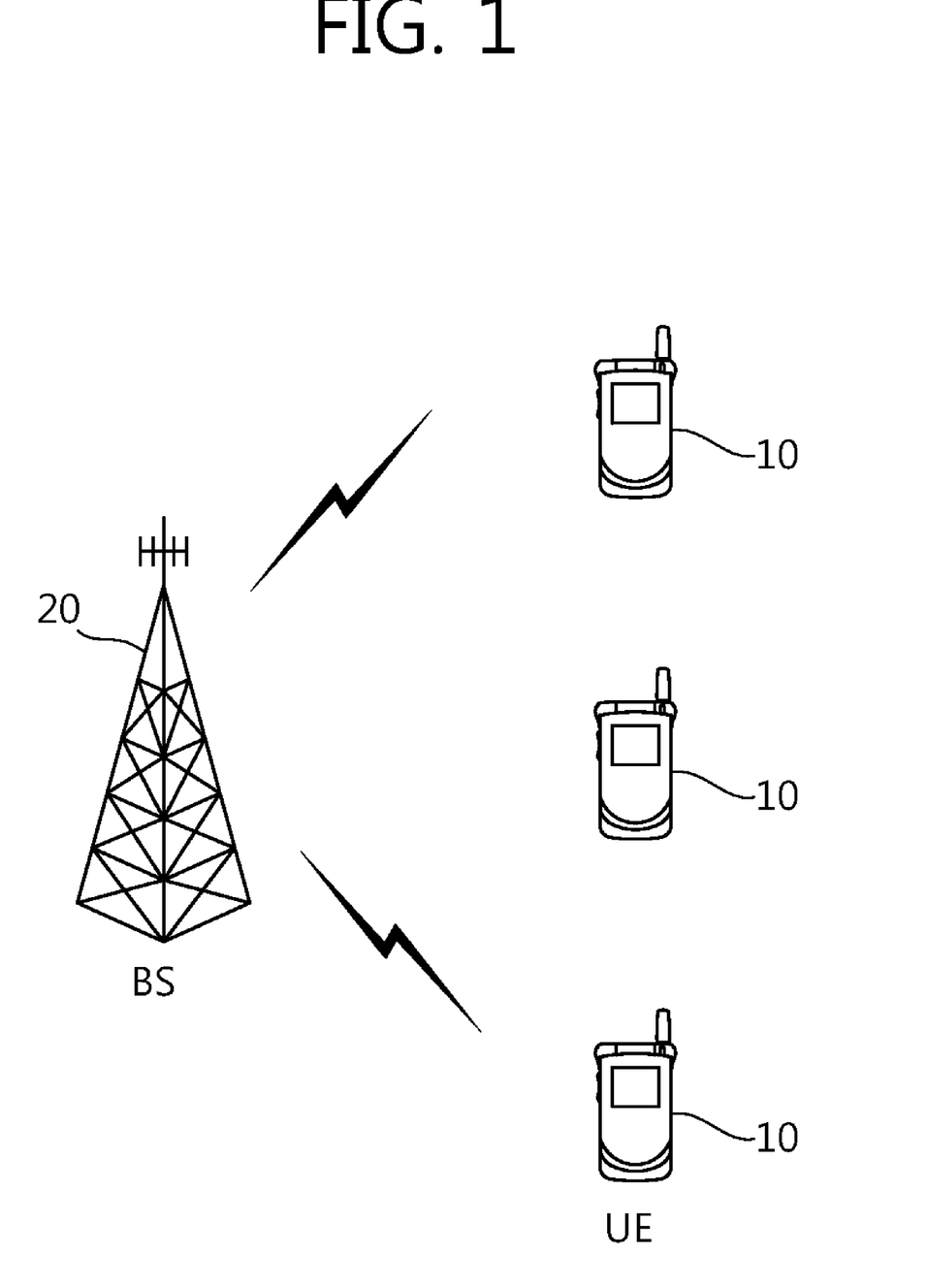
FIG. 1 is a block diagram showing a wireless communication system.

FIG. 1 is a block diagram showing a wireless communication system. The wireless communication systems are widely deployed in order to provide various communication services, such as voice and packet data.

Referring to FIG. 1, the wireless communication system includes User Equipment (UE) 10 and a Base Station (BS) 20. The UE 10 may be fixed or mobile and called another terminology, such as a Mobile Station (MS), a User Terminal (UT), a Subscriber Station (SS), or a wireless device. In general, the BS 20 refers to a fixed station communicating with the UEs 10, and it may be called another terminology, such as a Node-B, a Base Transceiver System (BTS), or an access point. One or more cells may exist in one BS 20.

Hereinafter, downlink (DL) refers to communication from the BS 20 to the UE 10, and uplink (UL) refers to communication from the UE 10 to the BS 20. In downlink, a transmitter may be part of the BS 20, and a receiver may be part of the UE 10. In uplink, a transmitter may be part of the UE 10, and a receiver may be part of the BS 20.

The wireless communication system may be an Orthogonal Frequency Division Multiplexing (OFDM)/Orthogonal Frequency Division Multiple Access (OFDMA)-based system. OFDM employs a plurality of orthogonal subcarriers. OFDM employs an orthogonality characteristic between Inverse Fast Fourier Transform (IFFT) and Fast Fourier Transform (FFT). A transmitter performs IFFT on data and sends the data. A receiver restores original data by performing FFT on a reception signal. The transmitter uses IFFT in order to combine multiple subcarriers, and the receiver uses corresponding FFT in order to separate multiple subcarriers.

The wireless communication system may be a multiple antenna system. The multiple antenna system may be a Multiple-Input Multiple-Output (MIMO) system. Alternatively, the multiple antenna system may be a Multiple-Input Single-Output (MISO) system, a Single-Input Single-Output (SISO) system, or a Single-Input Multiple-Output (SIMO) system. The MIMO system uses a plurality of transmission antennas and a plurality of reception antennas. The MISO system uses a plurality of transmission antenna and one reception antenna. The SISO system uses one transmission antenna and one reception antenna. The SIMO system uses one transmission antenna and a plurality of reception antenna.

In the multiple antenna system, Space-Time Coding (SPC), such as Space Frequency Block Codes (SFBC) and Space Time Block Codes (STBC), Cyclic Delay Diversity (CDD), Frequency Switched Transmit Diversity (FSTD), and Time Switched Transmit Diversity (TSTD) may be used as a scheme using multiple antennas at rank 1. Spatial Multiplexing (SM), Generalized Cyclic Delay Diversity (GCDD), and Selective Virtual Antenna Permutation (S-VAP) may be used as a scheme using multiple antennas at rank 2 or higher. SFBC is a scheme capable of securing both a diversity gain and a multiple user scheduling gain in a corresponding dimension by efficiently applying selectivity in the space region and the frequency domain. STBC is a scheme for applying selectivity in the space region and the time domain. FSTD is a scheme for classifying signals, transmitted through multiple antennas, according to frequencies. TSTD is a scheme for classifying signals, transmitted through multiple antennas, according to time. Spatial multiplexing is a scheme for raising the transmission rate by sending different data per antenna. GCDD is a scheme for selectivity in the time domain and the frequency domain. S-VAP is a scheme using a single precoding matrix, and it includes a Multi Codeword (MCW) S-VAP in which multiple codewords are mixed between antennas in spatial diversity or spatial multiplexing and a Single Codeword (SCW) S-VAP using a single codeword.

Figure 2:
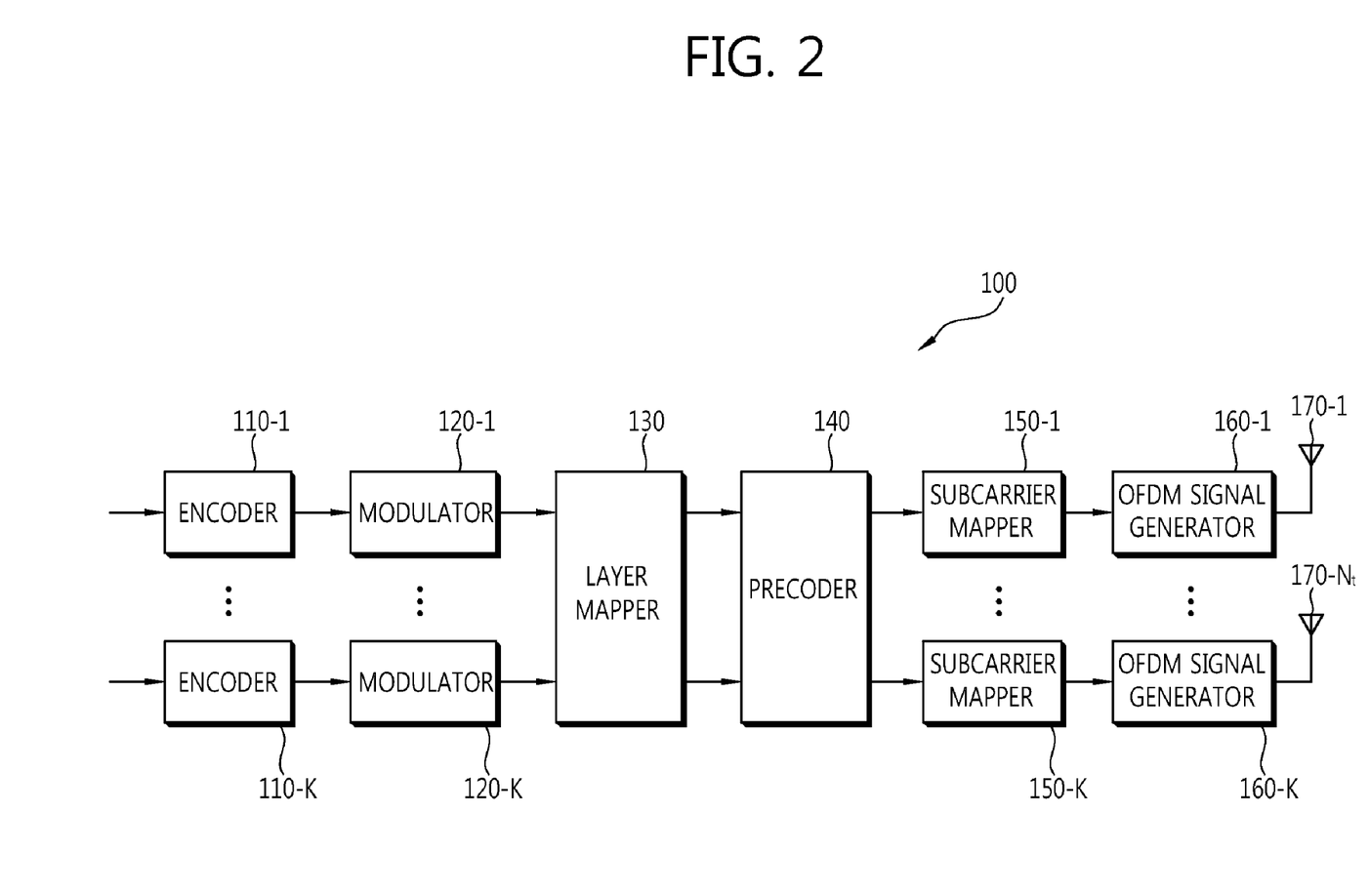
FIG. 2 shows an example of a transmitter structure.

FIG. 2 shows an example of a transmitter structure.

Referring to FIG. 2, the transmitter 100 includes encoders 110-1 to 110-K, modulators 120-1 to 120-K, a layer mapper 130, a precoder 140, subcarrier mappers 150-1 to 150-K, and OFDM signal generators 160-1 to 160-K. The transmitter 100 includes an Nt (Nt≧1) number of transmission antennas 170-1 to 170-Nt.

The encoders 110-1 to 110-K form coded data by encoding received data according to a predetermined coding scheme. The coded data may be called a codeword, and a codeword b may be represented by Equation 1 below.

$$b^{(q)}(0), \ldots, b^{(q)}(M_{bit}^{(q)}-1) \qquad \text{Equation 1}$$

wherein q is the index of a codeword, and $M_{bit}^{(q)}$ is the number of bits of the codeword q.

The codeword is subjected to scrambling. A scrambled codeword c may be represented by Equation 2.

$$c^{(q)}(0), \ldots, c^{(q)}(M_{bit}^{(q)}-1) \qquad \text{Equation 2}$$

The modulators 120-1 to 120-K arrange the codeword in the form of symbols which represent locations on a signal constellation. The modulation scheme is not limited and may be m-Phase Shift Keying (m-PSK) or m-Quadrature Amplitude Modulation (m-QAM). For example, the m-PSK may be BPSK, QPSK, or 8-PSK, and the m-QAM may be 16-QAM, 64-QAM, or 256-QAM.

The codeword d arranged in the form of the symbols on the signal constellation may be represented by Equation 3.

$$d^{(q)}(0), \ldots, d^{(q)}(M_{symb}^{(q)}-1) \qquad \text{Equation 3}$$

Wherein $M_{symb}^{(q)}$ is the number of symbol of the codeword q.

The layer mapper 130 defines the layer of an input symbol such that the precoder 140 can distribute antenna-specific symbols to the path of each antenna. The layer is defined as information path to the precoder 140. A symbol x inputted to the path of each antenna may be represented by Equation 4.

$$x(i)=[x^{(0)}(i) \ldots x^{(\upsilon-1)}(i)]^T \qquad \text{Equation 4}$$

wherein $\upsilon$ indicates the number of layers.

Information path anterior to the precoder 140 may be called a virtual antenna or layer. The precoder 140 processes the input symbols according to the MIMO scheme according to the multiple transmission antennas 170-1 to 170-Nt. The precoder 140 may use codebook-based precoding. In the codebook-based precoding scheme, the codebook may be a codebook (for example, a 4Tx rank 1 codebook) generated from the existing codebook (for example, a 2Tx rank 1 codebook) according to the present invention.

The precoder 140 distributes antenna-specific symbols into the subcarrier mappers 150-1 to 150-K on the path of a corresponding antenna. The precoder 140 distributes the antenna-specific symbols into the subcarrier, mappers 150-1 to 150-K of the path of a corresponding antenna. Each piece of information path transmitted from the precoder 140 to one antenna through one subcarrier mapper is called a stream. This may be called a physical antenna.

A signal $y^{(p)}(i)$ sent to each antenna port p may be represented by Equation 5.

$$y(i)=[\ldots y^{(p)}(i) \ldots]^T \qquad \text{Equation 5}$$

The subcarrier mappers 150-1 to 150-K allocate the precoded symbols to proper subcarriers and multiplex the precoded symbols according to a user. The OFDM signal generators 160-1 to 160-K modulate the symbols, mapped to the subcarriers, according to an OFDM scheme and output OFDM symbols. The OFDM signal generators 160-1 to 160-K may perform IFFT (Inverse Fast Fourier Transform) on the input symbols, and a Cyclic Prefix (CP) may be inserted into a time domain symbol on which IFFT has been performed. The OFDM symbols are transmitted through the respective transmission antennas 170-1 to 170-Nt.

In the MIMO system, the transmitter 100 may be operated in two kinds of modes. One of the two kinds of modes is an SCW mode, and the other thereof is an MCW mode. In the SCW mode, transmission signals transmitted through MIMO channels have the same data rate. In the MCW mode, data transmitted through MIMO channels may be independently coded, and transmission signals may have different data rates. The MCW mode is operated when the rank is 2 or higher.

One of the major problems of an OFDM/OFDMA system is that the Peak-to-Average Power Ratio (PAPR) may be very high. The PAPR problem is that the peak amplitude of a transmission signal is very greater than the average amplitude. The PAPR problem is caused by the fact that an OFDM symbol is the overlapping of an N number of sinusoidal signals on different subcarriers. The PAPR is particularly related to the capacity of the battery, and it becomes problematic in a UE which is sensitive to power consumption. In order to reduce power consumption, the PAPR needs to be lowered.

One of systems proposed to lower the PAPR is Single Carrier-Frequency Division Multiple Access (SC-FDMA). An SC-FDMA system is a form in which a Frequency Division Multiple Access (FDMA) system is grafted onto a Single Carrier-Frequency Division Equalization (SC-FDE) scheme. SC-FDMA has a similar characteristic to OFDMA in that data is modulated and demodulated in the time domain and the frequency domain using Discrete Fourier Transform (DFT), but is advantageous in reduction of transmission power because a transmission signal has a low PAPR. In particular, in relation to the use of the battery, SC-FDMA may be said to be advantageous in uplink communication from a UE which is sensitive to transmission power to a BS. In the SC-FDMA system, the symbol x of each antenna path is subjected to DFT spreading, and the symbols precoded in order to maintain a low PAPR are mapped to subcarriers through localized mapping, interleaved mapping or the like.

An important point when a UE sends data to a BS is that the bandwidth of the transmitted data needs not to be great, but the coverage capable of concentrating power has to be wide. An SC-FDMA system makes a signal have a small shift, so that the coverage is wider than that of other systems in the case where the same power amplifier is used.

Meanwhile, in a clustered DFT-S-OFDM scheme, unlike the SC-FDMA scheme, M (<N) symbol strings from among DFT-spread N symbol strings are allocated (or mapped) to consecutive subcarriers, and the remaining N-M symbol strings are allocated (or mapped) to consecutive subcarriers which are spaced apart from the subcarriers to which the M symbol strings have been allocated (or mapped) by a certain interval. If the clustered DFT-S-OFDM scheme is used, there is an advantage in that frequency selective scheduling can be performed.

Figure 3:
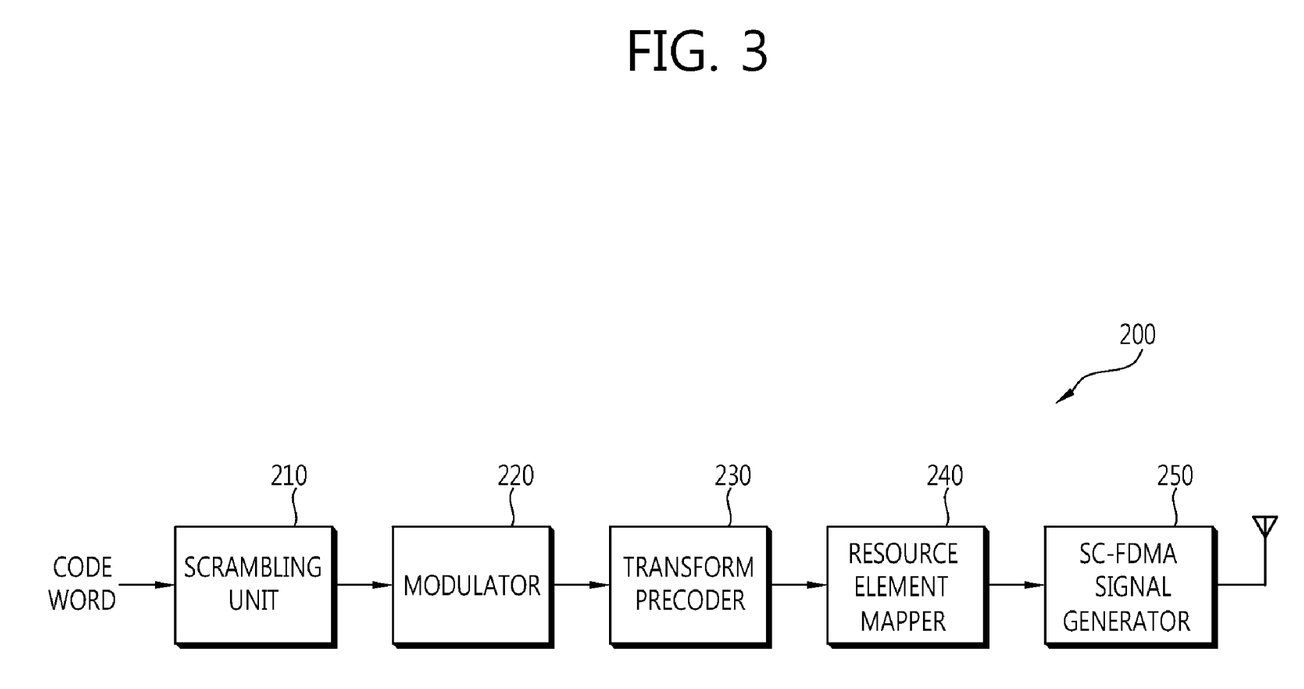
FIG. 3 shows another example of a transmitter structure.

FIG. 3 shows another example of a transmitter structure. The transmitter structure may be used for uplink transmission using an SC-FDMA access method.

Referring to FIG. 3, the transmitter 200 includes a scrambling unit 210, a modulator 220, a transform precoder 230, a resource element mapper 240, and an SC-FDMA signal generator 250.

The scrambling unit 210 scrambles received codewords. The codeword may have the length as long as the number of bits transmitted through the PUSCHs of one subframe. The modulator 220 arranges the scrambled codewords in modulation symbols to represent locations on a signal constellation. The modulation scheme is not limited and may be m-PSK or m-QAM. For example, in PUSCHs, QPSK, 16QAM, 64QAM, or the like may be used as the modulation scheme.

The transform precoder 230 may output DFT symbols using a DFT operation. The transform precoder 230 spreads the codewords arranged on the modulation symbols on the signal constellation and makes the codewords correspond to one SC-FDMA symbol. In an MIMO system, the transform precoder 230 may spread a layer-mapped modulation symbol. Alternatively, the transform precoder 230 may perform layer mapping after transforming a symbol before layer mapping.

In a closed-loop MIMO system, precoding is applied to a virtual antenna or a signal mapped a layer and may be applied likewise in OFDMA/SC-FDMA/Clustered-DFT-s-OFDM systems.

The resource element mapper 240 maps the DFT symbol, outputted from the transform precoder 230, to resource elements. The SC-FDMA signal generator 250 generates an SC-FDMA signal of the time domain for each antenna. The SC-FDMA signals are transmitted through the transmission antennas.

Figure 4:
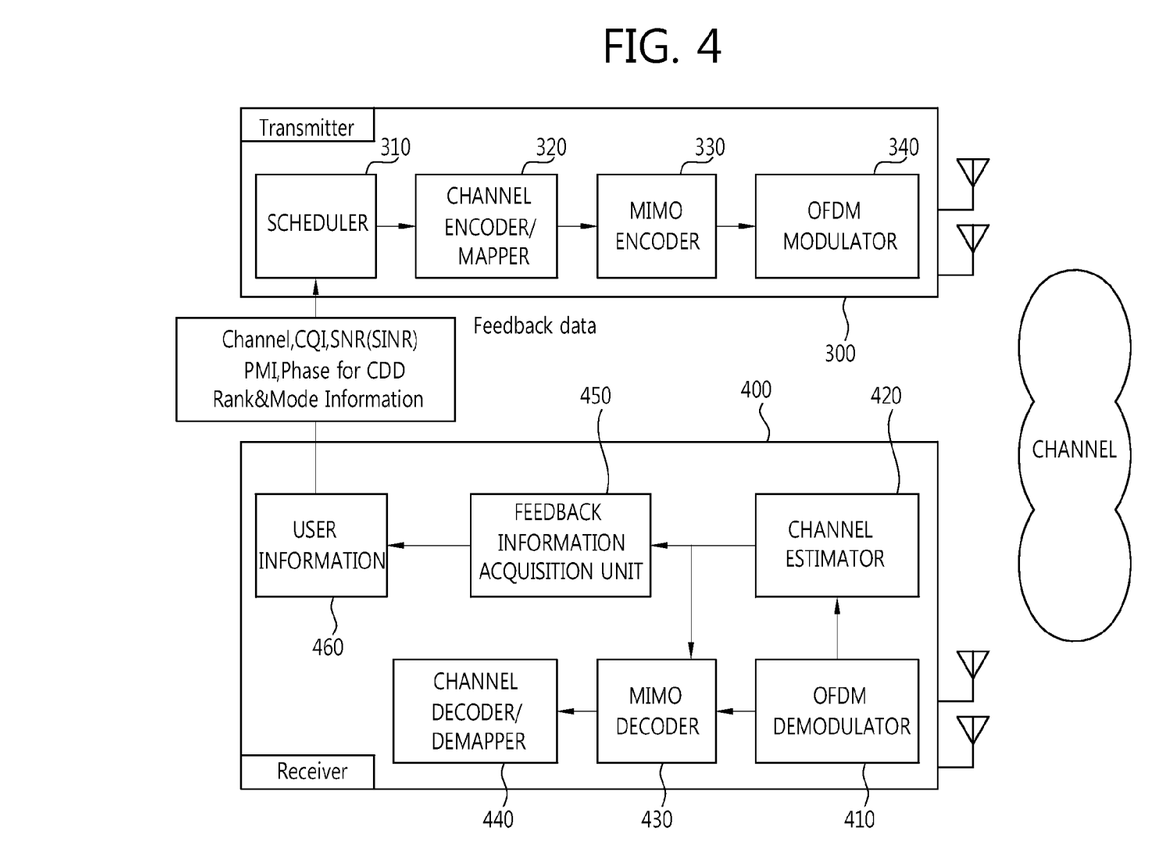
FIG. 4 shows data processing between a transmitter and a receiver in a multiple antenna system.

FIG. 4 shows data processing between a transmitter and a receiver in a multiple antenna system.

Referring to FIG. 4, the transmitter 300 includes a scheduler 310, a channel encoder/mapper 320, an MIMO encoder 330, and an OFDM modulator 330. The transmitter 300 includes an Nt (Nt>1) number of transmission antennas. The transmitter 300 may be part of a BS in downlink and part of a UE in uplink.

The scheduler 310 receives data from an N number of users and outputs a K number of streams to be transmitted at once. The scheduler 310 determines a user to which available radio resources will be transmitted and the transmission rate on the basis of channel information of each user. The scheduler 310 extracts channel information from feedback data and selects a code rate, a Modulation and Coding Scheme (MCS) and so on. For the operation of an MIMO system, the feedback data may include pieces of control information, such as a Channel Quality Indicator (CQI), Channel State Information (CSI), a channel covariance matrix, a precoding weight, and a channel rank. The CSI includes a channel matrix, a channel correlation matrix, a quantized channel matrix, or a quantized channel correlation matrix between a transmitter and a receiver. The CQI includes a Signal to Noise Ratio (SNR), a Signal to Interference and Noise Ratio (SINR), etc. between a transmitter and a receiver.

Available radio resources allocated by the scheduler 310 indicate radio resources used when data is transmitted in a wireless communication system. For example, in a Time Division Multiple Access (TDMA) system, each time slot is resources. In a Code Division Multiple Access (CDMA) system, each code and each time slot are resources. In an Orthogonal Frequency Division Multiple Access (OFDMA) system, each subcarrier and each time slot are resources. In order not to cause interference with other users within the same cell or sector, each resource may be orthogonally defined in the time, code, or frequency domain.

The channel encoder/mapper 320 forms coded data by encoding received streams according to a predetermined coding scheme and maps the coded data to symbols which represent locations on a signal constellation. The MIMO encoder 330 performs precoding on the received symbols. Such precoding is a scheme for preprocessing symbols to be transmitted. The precoding scheme includes RBF (random beamforming), ZFBF (zero forcing beamforming), etc. which generate symbols using a weight vector or a precoding matrix. Codebook-based precoding using predetermined codebook sets may be used as the precoding scheme.

The OFDM modulator 330 allocates the received symbols to proper subcarriers and sends the subcarriers through the transmission antennas.

The receiver 400 includes an OFDM demodulator 410, a channel estimator 420, an MIMO decoder 430, a channel decoder/demapper 440, and a feedback information acquisition unit 450. The receiver 300 includes an Nr (Nr>1) number of reception antennas. The receiver 300 may be part of a UE in downlink and part of a BS in uplink.

Signals received from the reception antennas are demodulated by the OFDM demodulator 410. The channel estimator 420 estimates channels. The MIMO decoder 430 performs post processing corresponding to the MIMO encoder 330. The decoder/demapper 440 demaps the received symbols into coded data and restores original data by decoding the coded data. The feedback information acquisition unit 450 generates user information 460, including CSI, CQI, a PMI, and so on. The generated user information 460 is composed of feedback data and transmitted to the transmitter 300.

Feedback Data of an MIMO-OFDM System>

For the operation of an MIMO-OFDM system, pieces of control information, such as a CQI, CSI, a channel covariance matrix, a precoding weight, and a channel rank, are required. In a Frequency Division Duplex (FDD) system, a receiver reports the pieces of information through feedback channels. In a Time Division Duplex (TDD) system, pieces of information to be used for downlink transmission may be acquired by estimating uplink channels using the reciprocity characteristic of a channel.

The CQI is necessary for the allocation of resources and link adaptation. An SNR, an SINR, etc. may be used as the CQI. The SNR/SINR may be quantized in 16 levels of a 1.89 dB interval and defined as a 4-bit CQI. The receiver quantizes the SNR/SINR and reports a defined CQI index to the transmitter. Furthermore, when an MIMO scheme is used, a maximum of 2 codewords (CW) may be supported. That is, for rank 2 or higher transmission, the CQIs of a first CW and a second CW have to be reported to the transmitter. The first CW may be represented by 4 bits, and the second CW may be represented by 3 bits as a difference with the first CW.

The precoding scheme is an MIMO scheme for preprocessing and sending transmission data strings using a preprocessing weight. Equation 6 represents a precoding scheme for preprocessing a transmission data string x using a preprocessing weight.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \quad \text{[Equation 6]}$$

$$\text{where, } i = 0, 1, \ldots, M_{symb}^{layer}$$

wherein W(i) indicates a precoding matrix. A preprocessed transmission data string y may employ a diversity matrix D(i) and a DFT matrix U for Cyclic Delay Diversity (CDD) as in Equation 7.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 7]}$$

D(i) and U may be determined according to a transmission layer.

Equation 8 shows an example in which a precoding matrix W(i) according to the rank is generated.

$$W(i) = C_k \quad \text{[Equation 8]}$$
$$k = \mathrm{mod}\left(\left\lfloor \frac{i}{v} \right\rfloor \mathrm{mod} 4\right) + 1$$
$$k \in \{1, 2, \ldots, 4\}$$

wherein $C_1$, $C_2$, $C_3$, and $C_4$ indicate precoding matrices corresponding to respective precoder indices 12, 13, 14, and 15. u indicates a rank (transmission layer).

Table 1 shows an example of a delay matrix D(i) and a DFT matrix U for CDD (cyclic delay diversity) which is applied according to the transmission layer.

TABLE 1

| Number of layers | D(i) | U |
|---|---|---|
| 1 | $[1]$ | $[1]$ |
| 2 | $\begin{bmatrix} 1 & 0 \\ 0 & e^{-j2\pi i/2} \end{bmatrix}$ | $\begin{bmatrix} 1 & 0 \\ 0 & e^{-j2\pi i/2} \end{bmatrix}$ |
| 3 | $\begin{bmatrix} 1 & 0 & 0 \\ 0 & e^{-j2\pi i/3} & 0 \\ 0 & 0 & e^{-j4\pi i/3} \end{bmatrix}$ | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ |
| 4 | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ |

There are zero forcing beamforming, eigen beamforming, and codebook-based precoding according to a method of generating the precoding weight. In order to apply each of the schemes, a CSI, a channel covariance matrix, a codebook index, etc. are required. In the existing system, codebook-based precoding is supported in two antennas (2Tx) and four antenna (4Tx) MIMO transmission. To this end, codebooks for 2Tx/4Tx are defined.

In the codebook-based precoding scheme, a receiver has several predetermined precoding matrices, estimates channels using a signal received from a transmitter, and determines a precoding matrix which is the most similar to an estimated channel state. The receiver feeds a determined PMI back to the transmitter. The transmitter selects a codebook suitable for the feedback precoding matrix and sends data. In the codebook-based precoding scheme, the amount of the feedback data is greatly reduced because only the PMI is transmitted. The codebook-based precoding scheme has a different system performance according to a method of configuring a codebook, the type of the codebook, and the size of the codebook. In the codebook-based precoding scheme, if a codebook does not sufficiently represent a channel state, performance may be deteriorated. However, if the size of a codebook is increased, the codebook can sufficiently represent a channel state and thus may approach optimal performance. Accordingly, there is a need for a design of a codebook which can approach optimal performance while sufficiently reducing the amount of feedback data.

With an increase of the number of transmission antennas, the size of a required codebook is increased. In 2Tx transmission of the existing system, a codebook having four precoding matrices for a rank 1 is defined. For example, when a UE having two transmission antennas performs rank 1 transmission in uplink transmission, the UE may perform the uplink transmission using any one of the four precoding matrices for the rank 1.

Closed-loop MIMO>

A method of using a precoding weight similar to a channel according to a channel condition is called a closed-loop MIMO scheme. A method of using a precoding weight according to a specific rule irrespective of a channel condition is called an open-loop MIMO scheme.

For the closed-loop MIMO scheme, the amount of the precoding weight reported by a receiver may vary according to a frequency unit, a report cycle, and so on. The frequency unit may be defined as a frequency range to which one precoding weight is applied. System bandwidths may be classified into frequency units, such as a wideband (WB), a subband (SB), and a bestband (BB) according to the frequency range. The subband may include at least one subcarrier, and the wideband may include at least one subband. The bestband refers to a band having the best channel state according to channel measurement in a receiver. In the codebook-based precoding scheme, a defined PMI is fed back. A WB PMI, an SB PMI, and a BB PMI may be defined according to the range to which the PMI is applied. A PMI capable of maximizing the average throughput of resources of a specific band is selected from among defined precoding matrices. The precoding weight has better performance with a reduction in the range.

Assuming that a bundle of 12 consecutive subcarriers is called a resource block, the system bandwidth and the subband may be represented by using the resource block as a basic unit. Table 3 shows an example in which the system bandwidth and the subband are represented by using the resource block as the basic unit.

TABLE 2

| System bandwidth | Subband size | M (number of bestbands) |
|---|---|---|
| 6-7 | Wideband CQI only | Wideband CQI only |
| 8-11 | 2 | 1 |
| 11-26 | 2 | 3 |
| 27-63 | 3 | 5 |
| 64-110 | 4 | 6 |

The wideband (WB) may be defined as a system bandwidth or as the greatest unit for calculating a CQI. The subband (SB) may be defined as a k number of consecutive resource blocks and as a minimum unit for calculating a CQI. The number of bestbands may be determined according to the system bandwidth.

Different subband sizes may be defined according to the system bandwidth. A CQI calculation range and a PMI application range may have the same value. For example, in a system having 24 resource blocks as the system bandwidth, a method of calculating a CQI and applying a PMI is described.

In the case where a WB CQI and a WB PMI are transmitted, a receiver selects a PMI capable of maximizing the average throughput of the 24 resource blocks and calculates an average CQI of the 24 resource blocks using the selected PMI. The receiver can find one WB CQI and one WB PMI.

(2) In the case where an SB CQI and an SB PMI are transmitted, a receiver selects a PMI for subbands consisting of two resource blocks and calculates an average CQI. The receiver can find 12 SB CQIs and 12 SB PMIs.

(3) In the case where an SB CQI and a WB PMI are transmitted, a receiver selects a PMI capable of maximizing the average throughput of the 24 resource blocks and calculates an average CQI per two resource blocks using the PMI (12 CQIs/1 PMI). The receiver can find 12 SB CQIs and one WB PMI.

(4) In the case where a WB CQI and an SB PMI are transmitted, a receiver selects a PMI per two resource blocks and calculates an average CQI of the 24 resource blocks using the selected PMIs. The receiver can find one WB CQI and 12 SB PMIs.

(5) In the case where best M average CQI/PMI and WB CQI/PMI are transmitted, a receiver selects 3 subbands having the best throughput, from among subbands of two resource block unit, selects a PMI for the bestband (2×3=6RB), calculates an average CQI of the bestbands, selects a PMI for all the band 24 resource blocks, and calculates a CQI.

<Opportunistic Beamforming>

When taking scheduling in which resources are allocated to a user having almost the highest point in a channel condition into consideration, in the case where the channel of each user is in a static channel condition whose change is slow, a multi-user diversity gain is reduced. A scheme for raising the multi-user gain by making the static channel condition into a faster and greater channel condition through spatial signal processing is called an opportunistic beamforming scheme. If the opportunistic beamforming scheme is used, a BS may have an effect of forming a beam in an irregular direction by using a precoding weight having the size and phase of an irregular form in each antenna. Accordingly, a channel condition of each user can be changed more dynamically. In this case, if both the opportunistic beamforming scheme and the scheduling scheme are used in a channel condition in which a channel slowly changes, a greater multi-user diversity gain can be obtained. Furthermore, in an OFDMA system, a different precoding weight may be applied for every frequency resources. A scheduling gain may be obtained by making a frequency flat channel into a frequency selective channel. Frequency resources in an OFDMA system include a subblock, a resource block, subcarriers, and so on.

The codebook-based precoding scheme is a method of selecting a precoding matrix which is the most similar to a channel condition, from among predetermined precoding matrices, and reporting a PMI. The codebook-based precoding scheme is advantageous in that it can reduce overhead resulting from feedback data, but it has to configure a codebook using a combination of more codebook sets with an increase of the number of transmission antennas because the codebook consists of a combination of codebook sets, which can represent spatial channels. With an increase in the number of transmission antennas, there is a difficulty in designing the codebook. With an increase in the size of the codebook, the overhead of feedback data may be increased.

<Generation of a Codebook for Increased Transmission Antennas Using the Existing Codebook>

A method of generating a codebook for increased transmission antennas and sending data by utilizing the existing defined codebook will now be described. A method of generating a 4Tx rank 1 codebook from a 2Tx rank 1 codebook is described as an example. The 2Tx rank 1 codebook may be used when a UE using two transmission antennas performs uplink transmission of the rank 1, and the 4Tx rank 1 codebook may be used when a UE using four transmission antennas performs uplink transmission of the rank 1. However, the present invention relates to a method of generating a codebook for increased transmission antennas from a codebook for the existing less number of transmission antennas and may also be used in downlink transmission. Furthermore, the present invention is not limited to the number of antennas. For example, a codebook for four or more transmission antenna may be generated from a codebook for two transmission antennas. Although the proposed method is described assuming the rank is 1, the method may also be applied to a rank 2 or higher.

Figure 5:
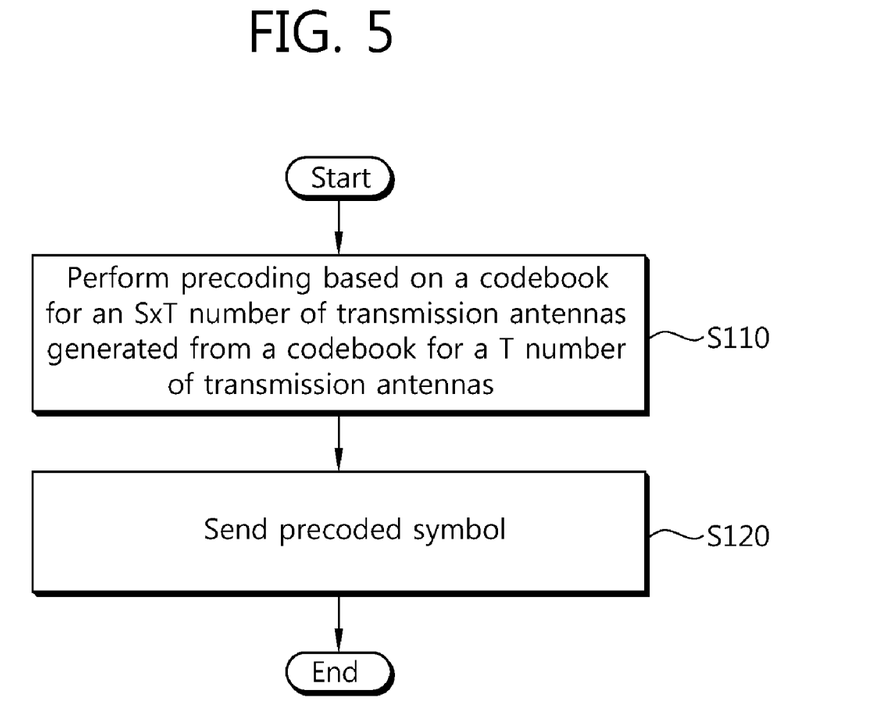
FIG. 5 shows a method of sending data using a codebook according to an embodiment of the present invention.

FIG. 5 shows a method of sending data using a codebook according to an embodiment of the present invention.

Referring to FIG. 5, a codebook for increased transmission antennas may be generated from a codebook for a plurality of transmission antennas. Precoding is performed on the basis of the generated codebook at step S110. That is, a codebook for an S*T number of transmission antennas which is a multiple of a T number of integers may be generated from a codebook for the existing T number of transmission antennas (S and T are an integer greater than 1).

For convenience of description hereinafter, it is assumed that the existing codebook is a first codebook, a precoding matrix included in the first codebook is a first precoding matrix, the codebook for the increased transmission antenna is a second codebook, and a precoding matrix included in the second codebook is a second precoding matrix.

Equation 9 shows a case where a phase rotation matrix $D(k_i)$ of a diagonal form for specific phase rotation is applied to each row of a precoding matrix $W(i)$.

$$D(k_i)W(i) = \begin{bmatrix} e^{j\theta_0 i} & 0 & \cdots & 0 \\ 0 & e^{j\theta_p i} & \cdots & 0 \\ \vdots & \vdots & \ddots & \vdots \\ 0 & 0 & \cdots & e^{j\theta_{p-1} i} \end{bmatrix} W(i) \quad \text{[Equation 9]}$$

wherein $e^{j\theta_p i}$ indicates a specific phase, and $\theta_p$ has a value between $-\pi$ and $\pi$. Furthermore, each of elements may be represented by a specific complex value having an independent phase $\theta_p$ ($-\pi < \theta_p \leq \pi$, p=0, ..., P-1).

Furthermore, $\theta_p = -2\pi \cdot k_i \cdot p \cdot \delta$, p=0, ..., P-1 is the frequency domain index of a resource element to which a complex valued symbol y(i) is mapped. $k_i$ is a frequency index, p is the index of a transmission antenna, and $\theta_p$ indicates a phase increased with an increase of $k_i$ and p. A delay value $\delta$ may be defined as in Table 3.

TABLE 3

| | 2Tx | 4Tx | 8Tx |
|---|---|---|---|
| 1 | 2/η | 1/η | — |
| 2 | 4/η | 2/η | 1/η |
| | | η = {128, 256, 512, 1024, 2048} | | wherein η may have the same value as the FFT size of a system bandwidth or fixedly have one of the five values irrespective of the system bandwidth. Since a delay matrix $D(k_i)$ is [1] in rank 1 transmission, the delay matrix may be omitted in the rank 1 transmission.

The precoding matrix for second codebook generated from the first codebook may be represented by Equation 10.

$$W(i) = \begin{bmatrix} W_0(i) \\ W_1(i) \end{bmatrix} \quad \text{[Equation 10]}$$

wherein W(i) indicates the precoding matrix of the second codebook, and $W_0(i)$ and $W_1(i)$ are the precoding matrices of the first codebook. That is, the precoding matrix of the second codebook may be generated by a combination of the precoding matrices of the first codebook. For example, the precoding matrix of a 4Tx rank 1 codebook may be generated by a combination of two precoding matrices of a 2Tx rank 1 codebook.

The second codebook may be generated from multiplying the first codebook by a phase. The phase may be a fixed value, a different value according to the element of the second codebook, or a different value according to the row of the precoding matrix included in the second codebook. The elements of the second codebook refer to the precoding matrices of the second codebook.

The specific phase may have a complex scalar value, which is called a weight factor. If the weight factor of the complex scalar value is used, the second codebook may be represented by Equation 11.

$$W(i) = \begin{bmatrix} aW_0(i) \\ bW_1(i) \end{bmatrix} \quad \text{[Equation 11]}$$

In order to simplify the precoding operation, the weight factor may be predetermined.

$W_1(i)$ may be forced into $W_0(i)$, and thus the precoding matrix of the second codebook may be represented by Equation 12.

$$W(i) = \begin{bmatrix} aW_0(i) \\ bW_0(i) \end{bmatrix} \quad \text{[Equation 12]}$$

Assuming that a=1, b=1 and $W_0(i)=W_1(i)$, the precoding matrix of the second codebook may be represented by Equation 13.

$$W(i) = \begin{bmatrix} W_0(i) \\ W_0(i) \end{bmatrix} \quad \text{[Equation 13]}$$

Assuming that a=1, b=−1 and $W_0(i)=W_1(i)$, the precoding matrix of the second codebook may be represented by Equation 14.

$$W(i) = \begin{bmatrix} W_0(i) \\ -W_0(i) \end{bmatrix} \quad \text{[Equation 14]}$$

Assuming that a=1, b=j and $W_0(i)=W_1(i)$, the precoding matrix of the second codebook may be represented by Equation 15.

$$W(i) = \begin{bmatrix} W_0(i) \\ jW_0(i) \end{bmatrix}$$ [Equation 15]

Assuming that a=1, b=-j and $W_0(i)=W_1(i)$, the precoding matrix of the second codebook may be represented by Equation 16.

$$W(i) = \begin{bmatrix} W_0(i) \\ -jW_0(i) \end{bmatrix}$$ [Equation 16]

The precoding matrix of the second codebook to which a weight factor is applied may be represented by Equation 17, and a unitary matrix $W_2(i)$ may be represented by Equation 18.

$$W(i) = \left\{ \frac{1}{\sqrt{2}} \begin{bmatrix} W_0(i) \\ W_1(i) \end{bmatrix}, \frac{1}{\sqrt{2}} \begin{bmatrix} W_0(i) \\ -W_1(i) \end{bmatrix}, \frac{1}{\sqrt{2}} \begin{bmatrix} W_0(i) \\ jW_1(i) \end{bmatrix}, \frac{1}{\sqrt{2}} \begin{bmatrix} W_0(i) \\ -jW_1(i) \end{bmatrix} \right\}$$ [Equation 17]

$$W_2(i) = \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}$$ [Equation 18]

As described above, $W_0(i)$ and $W_1(i)$ may be $W_0(i)=W_1(i)$. Accordingly, an indicator to indicate $W_0(i)$ or $W_1(i)$ may be used as feedback information.

A method of generating a precoding matrix for a second codebook from a precoding matrix for a first codebook in the case where the first codebook is a 2Tx rank 1 codebook and the second codebook is a 4Tx rank 1 codebook is described below.

Equation 19 shows a precoding matrix for the 4Tx rank 1 codebook generated from a precoding matrix for the 2Tx rank 1 codebook. The precoding matrix for 2Tx rank 1 codebook includes an N number of elements (that is, precoding matrices) (N is an integer greater than 0).

$$W(k) = \begin{pmatrix} e^{j\theta_1(k)} & 0 & 0 & 0 \\ 0 & e^{j\theta_2(k)} & 0 & 0 \\ 0 & 0 & e^{j\theta_3(k)} & 0 \\ 0 & 0 & 0 & e^{j\theta_4(k)} \end{pmatrix} \cdot V1(n) \otimes V2(m)$$ [Equation 19]

wherein V1 and V2 indicate the 2Tx rank 1 codebook, n=0 to N-1, m=0 to N-1, and k=0 to N×N-1. θ indicates a specific phase. W(k) is the 4Tx rank 1 codebook and represented by a precoding matrix of 4×1.

It is assumed that when N=4, the 2Tx rank 1 codebook is pre-defined as in Equation 20.

$$V1 = \left\{ \begin{Bmatrix} 1 \\ 1 \end{Bmatrix}, \begin{Bmatrix} 1 \\ j \end{Bmatrix}, \begin{Bmatrix} 1 \\ -1 \end{Bmatrix}, \begin{Bmatrix} 1 \\ j \end{Bmatrix} \right\}$$ [Equation 20]

$$V2 = V1$$

The 4Tx rank 1 codebook in the case where the phase is 0 when N=4 is generated as in Equation 21.

$$W(k) = V1(n) \otimes V2(m)$$ Equation 21 n=0, ..., 3 m=0, ..., 3 k=0, ..., 15 wherein $\otimes$ indicates a Kroneker product.

In the case where the 2Tx rank 1 codebook is pre-defined as in Equation 20 and the phase is 0, the 4Tx rank 1 codebook may be generated as in Table 4.

TABLE 4

$$\begin{bmatrix} 1 \\ 1 \\ 1 \\ 1 \end{bmatrix} \quad \begin{bmatrix} 1 \\ 1 \\ j \\ j \end{bmatrix} \quad \begin{bmatrix} 1 \\ 1 \\ -1 \\ -1 \end{bmatrix} \quad \begin{bmatrix} 1 \\ 1 \\ -j \\ -j \end{bmatrix}$$

$$\begin{bmatrix} 1 \\ j \\ 1 \\ j \end{bmatrix} \quad \begin{bmatrix} 1 \\ j \\ j \\ -1 \end{bmatrix} \quad \begin{bmatrix} 1 \\ j \\ -1 \\ -j \end{bmatrix} \quad \begin{bmatrix} 1 \\ j \\ -j \\ 1 \end{bmatrix}$$

$$\begin{bmatrix} 1 \\ -1 \\ 1 \\ -1 \end{bmatrix} \quad \begin{bmatrix} 1 \\ -1 \\ j \\ -j \end{bmatrix} \quad \begin{bmatrix} 1 \\ -1 \\ -1 \\ 1 \end{bmatrix} \quad \begin{bmatrix} 1 \\ -1 \\ -j \\ j \end{bmatrix}$$

$$\begin{bmatrix} 1 \\ -j \\ 1 \\ -j \end{bmatrix} \quad \begin{bmatrix} 1 \\ -j \\ j \\ 1 \end{bmatrix} \quad \begin{bmatrix} 1 \\ -j \\ -1 \\ j \end{bmatrix} \quad \begin{bmatrix} 1 \\ -j \\ -j \\ -1 \end{bmatrix}$$

In order to maximize a codal distance, a specific one row of the precoding matrix of the 4Tx rank 1 codebook may be subjected to phase rotation. For example, the phases of first to third rows are set to 0, and the phase of a fourth row may be rotated as in Equation 22. Accordingly, the 4Tx rank 1 codebook may be generated as in Equation 23.

$$e^{j\pi\left(k - \lfloor \frac{k}{4} \rfloor\right)}, \quad k = 0, \ldots, 15$$ [Equation 22]

$$V1 = \left\{ \begin{Bmatrix} 1 \\ 1 \end{Bmatrix}, \begin{Bmatrix} 1 \\ j \end{Bmatrix}, \begin{Bmatrix} 1 \\ -1 \end{Bmatrix}, \begin{Bmatrix} 1 \\ j \end{Bmatrix} \right\}, V2 = V1$$ [Equation 23]

$$W(k) = \begin{pmatrix} e^{j0} & 0 & 0 & 0 \\ 0 & e^{j0} & 0 & 0 \\ 0 & 0 & e^{j0} & 0 \\ 0 & 0 & 0 & e^{j\angle\left(k - \lfloor \frac{k}{4} \rfloor\right)} \end{pmatrix} \cdot V1(n) \otimes V2(m)$$

n = 0, ..., 3
m = 0, ..., 3
k = 0, ..., 15

According to Equation 23, the 4Tx rank 1 codebook may be generated as in Table 5. Here, a minimum codal distance of the 4Tx rank 1 codebook is 0:8660, which satisfies an optimal distance.

TABLE 5

$$\begin{bmatrix}1\\1\\1\\1\end{bmatrix} \quad \begin{bmatrix}1\\1\\j\\-j\end{bmatrix} \quad \begin{bmatrix}1\\1\\-1\\-1\end{bmatrix} \quad \begin{bmatrix}1\\1\\-j\\j\end{bmatrix}$$

$$\begin{bmatrix}1\\j\\1\\-j\end{bmatrix} \quad \begin{bmatrix}1\\j\\j\\-1\end{bmatrix} \quad \begin{bmatrix}1\\j\\-1\\j\end{bmatrix} \quad \begin{bmatrix}1\\j\\-j\\1\end{bmatrix}$$

$$\begin{bmatrix}1\\-1\\1\\-1\end{bmatrix} \quad \begin{bmatrix}1\\-1\\j\\j\end{bmatrix} \quad \begin{bmatrix}1\\-1\\-1\\1\end{bmatrix} \quad \begin{bmatrix}1\\-1\\-1\\-j\end{bmatrix}$$

$$\begin{bmatrix}1\\-j\\1\\j\end{bmatrix} \quad \begin{bmatrix}1\\-j\\j\\1\end{bmatrix} \quad \begin{bmatrix}1\\-j\\-1\\-j\end{bmatrix} \quad \begin{bmatrix}1\\-j\\-j\\-1\end{bmatrix}$$

The generated codebook may obtain codebook sets having the same distance although it is subjected to row permutation. Furthermore, phase rotation based on a phase value of $-\pi$ may be to Table 5.

All the precoding matrices of the generated 4Tx rank 1 codebook are not used, but may be selectively used. The used precoding matrices of the 4Tx rank 1 codebook may be pre-defined between a BS and a UE, or a BS informs a UE of the used precoding matrices of the 4Tx rank 1 codebook.

A rank 1 codebook may be used along with an antenna selection codebook or an antenna group selection codebook. ½ may be used as an antenna power normalization factor.

Table 6 shows an example of the antenna group selection codebook selected by two of the four antennas.

TABLE 6

$$\frac{1}{2}\begin{bmatrix}1\\1\\0\\0\end{bmatrix} \quad \frac{1}{2}\begin{bmatrix}1\\j\\0\\0\end{bmatrix} \quad \frac{1}{2}\begin{bmatrix}1\\-1\\0\\0\end{bmatrix} \quad \frac{1}{2}\begin{bmatrix}1\\-j\\0\\0\end{bmatrix}$$

$$\frac{1}{2}\begin{bmatrix}0\\0\\1\\1\end{bmatrix} \quad \frac{1}{2}\begin{bmatrix}0\\0\\1\\j\end{bmatrix} \quad \frac{1}{2}\begin{bmatrix}0\\0\\1\\-1\end{bmatrix} \quad \frac{1}{2}\begin{bmatrix}0\\0\\1\\-j\end{bmatrix}$$

A combination of two antenna groups selected from among the four antennas may include (1,2)(3,4), (1,3)(2,4), or (1,4)(2,3). Here, (x,y) refers to a group of an $x^{th}$ antenna and a $y^{th}$ antenna. Table 6 shows an example of the antenna group selection codebook having an antenna group combination of (1,2)(3,4). The antenna group selection codebook may be configured such that it has a QPSK phase for the two selected antennas.

The antenna power normalization factor of ½ may be applied to Table 5, and Tables 5 and 6 are combined to form a 4Tx rank 1 codebook, including 24 elements as in Table 7.

TABLE 7

$$\frac{1}{2}\begin{bmatrix}1\\1\\1\\1\end{bmatrix} \quad \frac{1}{2}\begin{bmatrix}1\\1\\j\\-j\end{bmatrix} \quad \frac{1}{2}\begin{bmatrix}1\\1\\-1\\-1\end{bmatrix} \quad \frac{1}{2}\begin{bmatrix}1\\1\\-j\\j\end{bmatrix} \quad \frac{1}{2}\begin{bmatrix}1\\j\\1\\-j\end{bmatrix} \quad \frac{1}{2}\begin{bmatrix}1\\j\\j\\-1\end{bmatrix}$$

$$\frac{1}{2}\begin{bmatrix}1\\j\\-1\\j\end{bmatrix} \quad \frac{1}{2}\begin{bmatrix}1\\j\\-j\\1\end{bmatrix} \quad \frac{1}{2}\begin{bmatrix}1\\-1\\1\\-1\end{bmatrix} \quad \frac{1}{2}\begin{bmatrix}1\\-1\\j\\j\end{bmatrix} \quad \frac{1}{2}\begin{bmatrix}1\\-1\\-1\\1\end{bmatrix} \quad \frac{1}{2}\begin{bmatrix}1\\-1\\-j\\-j\end{bmatrix}$$

$$\frac{1}{2}\begin{bmatrix}1\\-j\\1\\j\end{bmatrix} \quad \frac{1}{2}\begin{bmatrix}1\\-j\\j\\1\end{bmatrix} \quad \frac{1}{2}\begin{bmatrix}1\\-j\\-1\\-j\end{bmatrix} \quad \frac{1}{2}\begin{bmatrix}1\\-j\\-j\\-1\end{bmatrix} \quad \frac{1}{2}\begin{bmatrix}1\\1\\0\\0\end{bmatrix} \quad \frac{1}{2}\begin{bmatrix}1\\j\\0\\0\end{bmatrix}$$

$$\frac{1}{2}\begin{bmatrix}1\\-1\\0\\0\end{bmatrix} \quad \frac{1}{2}\begin{bmatrix}1\\-j\\0\\0\end{bmatrix} \quad \frac{1}{2}\begin{bmatrix}0\\0\\1\\1\end{bmatrix} \quad \frac{1}{2}\begin{bmatrix}0\\0\\1\\j\end{bmatrix} \quad \frac{1}{2}\begin{bmatrix}0\\0\\1\\-1\end{bmatrix} \quad \frac{1}{2}\begin{bmatrix}0\\0\\1\\-j\end{bmatrix}$$

A 4Tx rank 1 codebook with consideration taken of an antenna group selection codebook in which a combination of antennas groups are configured as in (1,3)(2,4) may be configured as in Table 8.

TABLE 8

$$\frac{1}{2}\begin{bmatrix}1\\1\\1\\1\end{bmatrix} \quad \frac{1}{2}\begin{bmatrix}1\\1\\j\\-j\end{bmatrix} \quad \frac{1}{2}\begin{bmatrix}1\\1\\-1\\-1\end{bmatrix} \quad \frac{1}{2}\begin{bmatrix}1\\1\\-j\\j\end{bmatrix} \quad \frac{1}{2}\begin{bmatrix}1\\j\\1\\-j\end{bmatrix} \quad \frac{1}{2}\begin{bmatrix}1\\j\\j\\-1\end{bmatrix}$$

$$\frac{1}{2}\begin{bmatrix}1\\j\\-1\\j\end{bmatrix} \quad \frac{1}{2}\begin{bmatrix}1\\j\\-j\\1\end{bmatrix} \quad \frac{1}{2}\begin{bmatrix}1\\-1\\1\\-1\end{bmatrix} \quad \frac{1}{2}\begin{bmatrix}1\\-1\\j\\j\end{bmatrix} \quad \frac{1}{2}\begin{bmatrix}1\\-1\\-1\\1\end{bmatrix} \quad \frac{1}{2}\begin{bmatrix}1\\-1\\-j\\-j\end{bmatrix}$$

$$\frac{1}{2}\begin{bmatrix}1\\-j\\1\\j\end{bmatrix} \quad \frac{1}{2}\begin{bmatrix}1\\-j\\j\\1\end{bmatrix} \quad \frac{1}{2}\begin{bmatrix}1\\-j\\-1\\-j\end{bmatrix} \quad \frac{1}{2}\begin{bmatrix}1\\-j\\-j\\-1\end{bmatrix} \quad \frac{1}{2}\begin{bmatrix}1\\0\\1\\0\end{bmatrix} \quad \frac{1}{2}\begin{bmatrix}1\\0\\j\\0\end{bmatrix}$$

$$\frac{1}{2}\begin{bmatrix}1\\0\\-1\\0\end{bmatrix} \quad \frac{1}{2}\begin{bmatrix}1\\0\\-j\\0\end{bmatrix} \quad \frac{1}{2}\begin{bmatrix}0\\1\\0\\1\end{bmatrix} \quad \frac{1}{2}\begin{bmatrix}0\\1\\0\\j\end{bmatrix} \quad \frac{1}{2}\begin{bmatrix}0\\1\\0\\-1\end{bmatrix} \quad \frac{1}{2}\begin{bmatrix}0\\1\\0\\-j\end{bmatrix}$$

A 4Tx rank 1 codebook with consideration taken of an antenna group selection codebook in which a combination of antennas groups are configured as in (1,4)(2,3) may be configured as in Table 9.

TABLE 9

$$\frac{1}{2}\begin{bmatrix}1\\1\\1\\1\end{bmatrix} \quad \frac{1}{2}\begin{bmatrix}1\\1\\j\\-j\end{bmatrix} \quad \frac{1}{2}\begin{bmatrix}1\\1\\-1\\-1\end{bmatrix} \quad \frac{1}{2}\begin{bmatrix}1\\-1\\-j\\j\end{bmatrix} \quad \frac{1}{2}\begin{bmatrix}1\\j\\1\\-j\end{bmatrix} \quad \frac{1}{2}\begin{bmatrix}1\\j\\j\\-1\end{bmatrix}$$

TABLE 9-continued $$\frac{1}{2}\begin{bmatrix}1\\j\\-1\\j\end{bmatrix}, \frac{1}{2}\begin{bmatrix}1\\j\\-j\\1\end{bmatrix}, \frac{1}{2}\begin{bmatrix}1\\-1\\1\\-1\end{bmatrix}, \frac{1}{2}\begin{bmatrix}1\\-1\\j\\j\end{bmatrix}, \frac{1}{2}\begin{bmatrix}1\\-1\\-1\\1\end{bmatrix}, \frac{1}{2}\begin{bmatrix}1\\-1\\-j\\-j\end{bmatrix}$$

$$\frac{1}{2}\begin{bmatrix}1\\-j\\1\\j\end{bmatrix}, \frac{1}{2}\begin{bmatrix}1\\-j\\j\\1\end{bmatrix}, \frac{1}{2}\begin{bmatrix}1\\-j\\-1\\-j\end{bmatrix}, \frac{1}{2}\begin{bmatrix}1\\-j\\-j\\-1\end{bmatrix}, \frac{1}{2}\begin{bmatrix}1\\0\\0\\1\end{bmatrix}, \frac{1}{2}\begin{bmatrix}1\\0\\0\\j\end{bmatrix}$$

$$\frac{1}{2}\begin{bmatrix}1\\0\\0\\-1\end{bmatrix}, \frac{1}{2}\begin{bmatrix}1\\0\\0\\-j\end{bmatrix}, \frac{1}{2}\begin{bmatrix}0\\1\\1\\0\end{bmatrix}, \frac{1}{2}\begin{bmatrix}0\\1\\j\\0\end{bmatrix}, \frac{1}{2}\begin{bmatrix}0\\1\\-1\\0\end{bmatrix}, \frac{1}{2}\begin{bmatrix}0\\1\\-j\\0\end{bmatrix}$$

As described above, a 4Tx rank 1 codebook may be configured using a 2Tx rank 1 codebook. Only some of the elements illustrated in Tables 4 to 9 may be composed of the 4Tx rank 1 codebook and defined. Furthermore, the antenna power normalization factor is not limited, and not only QPSK, but also other modulation schemes may be used.

Symbols on which precoding has been performed on the basis of the 4Tx rank 1 codebook generated from the 2Tx rank 1 codebook are transmitted at step S120. The 4Tx rank 1 codebook may be defined in the precoder or memory of a transmitter. At least one precoding matrix, from among the elements included in the defined 4Tx rank 1 codebook, may be selected and precoded. The precoded symbols may be mapped to subcarriers, generated in the form of OFDM signals, and then transmitted.

As described above, since multiple extended antennas can be supported using the existing codebook, the complexity of a system can be reduced. Furthermore, the UE of the existing system not supporting multiple extended antennas may use the existing codebook without change. Accordingly, backward compatibility for the existing system can be guaranteed.

Figure 6:
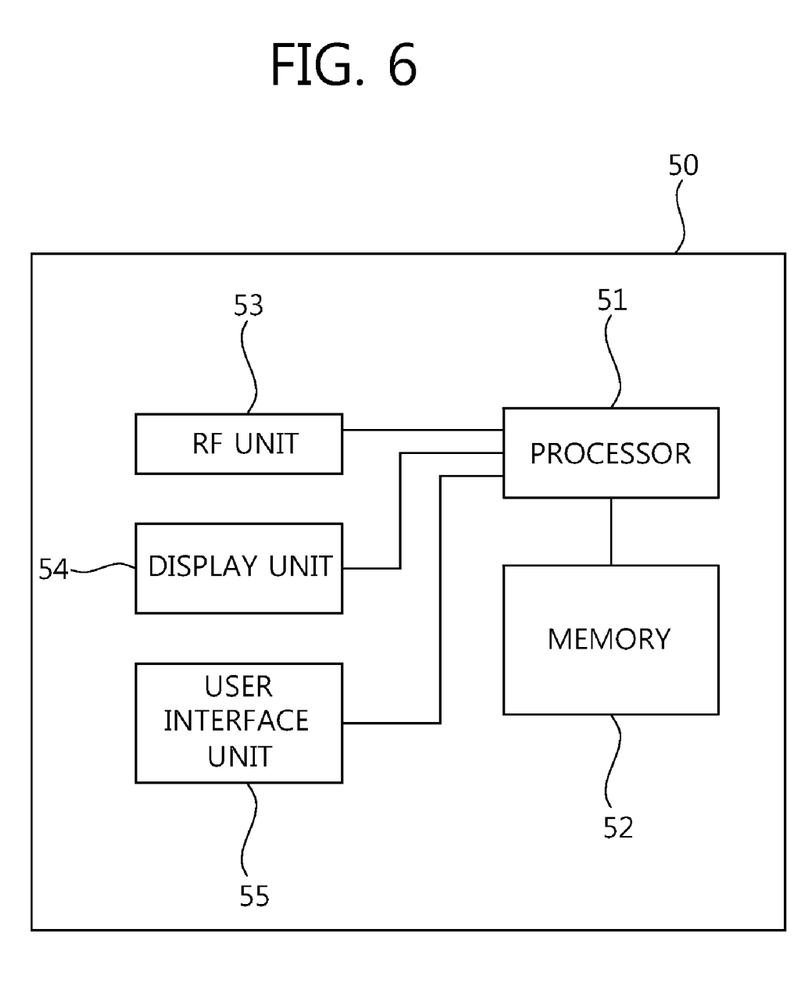
FIG. 6 is a block diagram showing the elements of a UE.

FIG. 6 is a block diagram showing the elements of a UE.

Referring to FIG. 6, the UE 50 includes a processor 51, memory 52, an RF unit 53, a display unit 54, and a user interface unit 55. The UE 50 may include a plurality of transmission antennas.

The processor 51 implements the layers of a radio interface protocol and provides a control plane and a user plane. The functions of the layers may be implemented by the processor 51. The processor 51 may implement the proposed precoding schemes. The memory 52 is coupled to the processor 51 and configured to store a UE driving system, applications, and common files. The memory 52 may store codebooks defined in order to support the codebook-based precoding scheme. The display unit 54 displays several pieces of information of a UE and may use a well-known element, such as a Liquid Crystal Display (LCD) or Organic Light Emitting Diodes (OLED). The user interface unit 55 may be composed of a combination of well-known user interfaces, such as the keypad or the touch screen. The RF unit 53 is coupled to the processor 51 and configured to send and receive radio signals.

The layers of a radio interface protocol between a UE and a network may be classified into L1 (a first layer), L2 (a second layer), and L3 (a third layer) on the basis of three lower layers of an Open System Interconnection (OSI) model between open systems widely known in communication systems. From among the three layers, a physical layer belonging to the first layer provides information transfer service using the physical channel. A Radio Resource Control (RRC) layer located in the third layer functions to control radio resources between a UE and a network. To this end, RRC messages are exchanged between the UE and the network in the RRC layer.

All the above functions may be executed by a processor, such as a microprocessor, a controller, a microcontroller, an Application Specific Integrated Circuit (ASIC) according to software or program codes coded to perform the above functions. The design, development, and implementation of the codes may be said to be evident to a person having ordinary skill in the art on the basis of the description of the present invention.

The existing codebook can be utilized with respect to multiple antennas more increased than the antennas of the existing multiple antenna system. Accordingly, the complexity of a system can be reduced, and backward compatibility for a user equipment not supporting multiple increased antennas can be guaranteed. Although the embodiments of the present invention have been described above, those having ordinary skill in the art will appreciate that the present invention may be modified in various ways without departing from the technical spirit and scope of the present invention. Accordingly, it may be said that the present invention is not limited to the embodiments and includes all embodiments falling within the scope of the claims.

What is claimed is:

1. A method for transmitting a signal in a multiple antenna system, the method performed by a transmitter and comprising:

generating a first group of pre-coding matrices including $$\begin{bmatrix}1\\1\\1\\1\end{bmatrix}, \begin{bmatrix}1\\1\\j\\-j\end{bmatrix}, \begin{bmatrix}1\\1\\-1\\-1\end{bmatrix}, \begin{bmatrix}1\\1\\-j\\j\end{bmatrix}, \begin{bmatrix}1\\j\\1\\-j\end{bmatrix}, \begin{bmatrix}1\\j\\j\\-1\end{bmatrix}, \begin{bmatrix}1\\j\\-1\\j\end{bmatrix}, \begin{bmatrix}1\\j\\-j\\1\end{bmatrix}, \begin{bmatrix}1\\-1\\1\\-1\end{bmatrix},$$

$$\begin{bmatrix}1\\-1\\j\\j\end{bmatrix}, \begin{bmatrix}1\\-1\\-1\\-j\end{bmatrix}, \begin{bmatrix}1\\-j\\-j\\j\end{bmatrix}, \begin{bmatrix}1\\-j\\j\\1\end{bmatrix}, \begin{bmatrix}1\\-j\\j\\1\end{bmatrix}, \begin{bmatrix}1\\-j\\-1\\-j\end{bmatrix}, \text{ and } \begin{bmatrix}1\\-j\\-j\\-1\end{bmatrix};$$

rotating a phase of a fourth row of the first pre-coding matrices using a phase value of $-\pi$;

applying an antenna power normalization factor to the first pre-coding matrices;

generating a second group of pre-coding matrices including $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\1\\0\end{bmatrix}, \frac{1}{2}\begin{bmatrix}0\\1\\1\\-1\end{bmatrix}, \frac{1}{2}\begin{bmatrix}0\\1\\0\\j\end{bmatrix} \text{ and}$$

$$\frac{1}{2}\begin{bmatrix}0\\1\\0\\-j\end{bmatrix};$$

pre-coding the signal based on a codebook comprising the first group of pre-coding matrices and the second group of pre-coding matrices; and transmitting the pre-coded signal using a radio resource.

2. The method of claim 1, wherein the phase-rotated first pre-coding matrices includes $$\begin{bmatrix}1\\1\\1\\-1\end{bmatrix}, \begin{bmatrix}1\\1\\j\\j\end{bmatrix}, \begin{bmatrix}1\\1\\-1\\1\end{bmatrix}, \begin{bmatrix}1\\1\\-j\\-j\end{bmatrix}, \begin{bmatrix}1\\j\\j\\j\end{bmatrix}, \begin{bmatrix}1\\j\\j\\-1\end{bmatrix}, \begin{bmatrix}1\\j\\-1\\-j\end{bmatrix}, \begin{bmatrix}1\\j\\-j\\-1\end{bmatrix}, \begin{bmatrix}1\\-1\\1\\1\end{bmatrix},$$

$$\begin{bmatrix}1\\-1\\j\\-j\end{bmatrix}, \begin{bmatrix}1\\-1\\-1\\-1\end{bmatrix}, \begin{bmatrix}1\\-1\\-j\\j\end{bmatrix}, \begin{bmatrix}1\\-j\\1\\-j\end{bmatrix}, \begin{bmatrix}1\\-j\\j\\-1\end{bmatrix}, \begin{bmatrix}1\\-j\\-1\\j\end{bmatrix} \text{ and } \begin{bmatrix}1\\-j\\-j\\1\end{bmatrix}.$$

3. The method of claim 1, wherein the antenna power normalization factor is ½.

4. The method of claim 1, wherein the radio resource comprises a Single-Carrier Frequency Division Multiple Access (SC-FDMA) signal.

5. A method for transmitting a signal in a multiple antenna system, the method performed by a transmitter and comprising:
pre-coding the signal based on a codebook, the codebook comprising a first group of pre-coding matrices and a second group of pre-coding matrices, the first group of pre-coding matrices including $$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix},$$

$$\frac{1}{2}\begin{bmatrix}1\\j\\-j\\-1\end{bmatrix}, \frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix},$$

$$\frac{1}{2}\begin{bmatrix}1\\-j\\-1\\j\end{bmatrix} \text{ and } \frac{1}{2}\begin{bmatrix}1\\-j\\-j\\1\end{bmatrix},$$

the second group of pre-coding matrices including $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix} \text{ and }$$

$$\frac{1}{2}\begin{bmatrix}0\\1\\0\\-j\end{bmatrix};$$

and
transmitting the pre-coded signal using a radio resource.

6. The method of claim 5, wherein an antenna power normalization factor of the first group of pre-coding matrices is same as an antenna power normalization factor of the second group of pre-coding matrices.

7. The method of claim 5, wherein the radio resource comprises a Single-Carrier Frequency Division Multiple Access (SC-FDMA) signal.

8. The method of claim 5, wherein the codebook is for rank 1 transmission.

9. The method of claim 5, wherein the first group of pre-coding matrices consist of $$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix},$$

$$\frac{1}{2}\begin{bmatrix}1\\j\\-j\\-1\end{bmatrix}, \frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix},$$

$$\frac{1}{2}\begin{bmatrix}1\\-j\\-1\\j\end{bmatrix} \text{ and } \frac{1}{2}\begin{bmatrix}1\\-j\\-j\\1\end{bmatrix}.$$

10. The method of claim 5, wherein the second group of pre-coding matrices consist of $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix} \text{ and }$$

$$\frac{1}{2}\begin{bmatrix}0\\1\\0\\-j\end{bmatrix}.$$

11. The method of claim 5, wherein the codebook consists of 24 different pre-coding matrices.

12. The method of claim 5, wherein the second group of pre-coding matrices are used for antenna group selection.

13. A transmitter comprising:
a pre-coder for pre-coding a signal based on a codebook, the codebook comprising a first group of pre-coding matrices and a second group of pre-coding matrices, the first group of pre-coding matrices including $$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix},$$

$$\frac{1}{2}\begin{bmatrix}1\\j\\-j\\-1\end{bmatrix}, \frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix},$$

-continued $$\frac{1}{2}\begin{bmatrix}1\\-j\\-1\\j\end{bmatrix} \text{ and } \frac{1}{2}\begin{bmatrix}1\\-j\\-j\\1\end{bmatrix},$$

the second group of pre-coding matrices including $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix} \text{ and }$$

$$\frac{1}{2}\begin{bmatrix}0\\1\\0\\-j\end{bmatrix};$$

and a radio frequency unit for transmitting the pre-coded signal using a radio resource.

14. The transmitter of claim 13, wherein an antenna power normalization factor of the first group of pre-coding matrices is same as an antenna power normalization factor of the second group of pre-coding matrices.

15. The transmitter of claim 13, wherein the radio resource comprises a Single-Carrier Frequency Division Multiple Access (SC-FDMA) signal.

16. The transmitter of claim 13, wherein the codebook is for rank 1 transmission.

17. The transmitter of claim 13, wherein the first group of pre-coding matrices consist of $$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix},$$

$$\frac{1}{2}\begin{bmatrix}1\\j\\-j\\-1\end{bmatrix}, \frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix},$$

$$\frac{1}{2}\begin{bmatrix}1\\-j\\-1\\j\end{bmatrix}, \text{ and } \frac{1}{2}\begin{bmatrix}1\\-j\\-j\\1\end{bmatrix},$$

18. The transmitter of claim 13, wherein the second group of pre-coding matrices consist of $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix} \text{ and }$$

$$\frac{1}{2}\begin{bmatrix}0\\1\\0\\-j\end{bmatrix}.$$

19. The transmitter of claim 13, wherein the codebook consists of 24 different pre-coding matrices.

20. The transmitter of claim 13, wherein the second group of pre-coding matrices are used for antenna group selection.

* * * * *